June 1, 1926.                                              1,587,391
O. P. McKEE

EDUCATIONAL GAME

Filed Nov. 19, 1925

Fig. 1.

LEDGER SHEET
B.A. FAIRPLAYER, Fond du Lac, Wis.

Name: I. M. Quickpay.
Address: 904 E. Second St.

| DATE | DEBITS OR CHARGES | DATE | CREDITS | BALANCE | |
|---|---|---|---|---|---|
| April | 8 75 | April | | 8 75 | WRITE CREDIT BALANCES IN RED. |
| " | | " | 5 00 | 3 75 | |
| " | | | | | |
| May | | May | | | |
| | | | | | |
| | | | | | |
| June | | June | | | |

Fig. 2.

Statement
Fond du Lac, Wis. May 1924
Mr. I. M. Quickpay.
In account with
B. A. Fairplayer
Apr. 7 Mdse. per invoice rendered 25 30

Fig. 3.

Credit Memo.
Fond du Lac, Wis. June 1924
Mr. I. M. Quickpay
In account with
B. A. Fairplayer
May 18 Credit for mdse. returned 1 50

Fig. 4.

Check
Fond du Lac, Wis. May 1924 No.
The Commercial National Bank.
Pay to the order of B. A. Fairplayer  1 15
One and 15/100 ——— Dollars
I. M. Quickpay

Fig. 5.

Draft Card
June 1924
Mr. B. A. Fairplayer
Dear Sir:
You may draw sight draft on me for the balance of my account and I will honor same.
Very Truly
I. M. Quickpay

Fig. 6.

Auditors Card
You have been engaged by Mr. I. M. Quickpay to make an audit of his books to and including June 30, 1924.
You are empowered to see that all errors are adjusted and that the books are in balance.
July 1924.

Inventor
O. P. McKee

By Robb, Robb & Hill
Attorneys

Patented June 1, 1926.

1,587,391

UNITED STATES PATENT OFFICE.

OLIVER P. McKEE, OF FOND DU LAC, WISCONSIN.

EDUCATIONAL GAME.

Application filed November 19, 1925. Serial No. 70,134.

This invention relates to improvements in educational apparatus, and more particularly to educational games.

The object in view is the pleasant, easy and ready acquiring by players of familiarity with the rudimentary principles of bookkeeping, and the end in view, in the playing of the game, is the balancing of the account in the hands of each individual player.

With this and other detail objects in view, as will in part hereinafter become apparent and in part be stated, the invention comprises certain novel arrangements of indicia on sheets and cards having such relation to each other as to enable the chance development of a commercial account and the balancing of the same.

In the accompanying drawings,—

Figure 1 is a plan view of a ledger sheet of the character to be supplied to each player, a few entries being indicated thereon for purposes of illustration.

Figures 2, 3, 4, 5 and 6 are similar views of playing cards utilized in connection with the conducting and balancing of the account by the respective players.

Referring to the drawings by numerals, 1 indicates a sheet or chart representing a ledger page and ruled to provide a column for dates, a debit column, a credit column, and a balance column, and, for facility, a second date column and a column for credit balances may be provided. A sheet similar to sheet 1 is supplied to each player and may carry any appropriate heading, such as the words "Ledger sheet" with the name of the supposed merchant and his address together with the name and address of the supposed customer. The several columns also preferably bear legends, such as the word "Date" at 2 over the first column; the words "Debits or charges" as at 3 over the second column; the word "Date" as at 4 over the third column; the word "Credits" as at 5 over the fourth column; the word "Balances" as at 6 over the fifth column, and the words "Write credit balance in red ink" as at 7 over the sixth column. As will become apparent, any ordinary ledger sheet may be utilized in lieu of the sheet 1, but it is preferable to have a balance column so that the player will show the balance on the face of the account as he proceeds, and a column should be provided for credit balances, or the player should strictly adhere to an entry in red for the credit balance in the balance column.

A pack, preferably of one hundred cards, is provided made up of such cards as card 8, card 9, card 10, card 11 and card 12, seen respectively in Figures 2 to 6 inclusive. Card 8 bears the indicia of a purchase made by the customer which is to be charged on account under the date indicated on card 8, as, for example, card 8 may bear the indicia "Apr. 7 mdse. per invoice rendered $25.30", and because of the nature of card 8 it may be referred to as the "Debit or statement" card, and preferably bears the word "Statement" at the head. Card 9 is employed to indicate value received by the merchant from the customer, as when the customer returns certain goods. Said card is, therefore, preferably known as the "Credit memo" card, and usually carries heading indicia of this character. It also contains indicia of the transaction, as, for example, in the words "May 18 credit for mdse. returned, $1.50." Card 10 is a payment or check card, preferably bearing the word "Check" and indicia showing the amount paid by the customer to the merchant, and is preferably provided with indicia corresponding to that of an ordinary check whose face shows the amount of the payment. Card 11 is another payment card bearing indicia of instructions for a sight draft signed by the customer and authorizing the merchant to draw upon him for the balance due on account, and card 11 is, therefore, known as the "Draft" card and preferably bears as a heading the words "Draft card". Card 12, which is known as the "auditor's" card, bears indicia of this fact at its head, and preferably contains instructions authorizing the correcting of errors and the adjusting of the account, so that the player who receives one of the "auditor's" cards under the proper conditions of the rule of the game may effect a balance by claiming an error sufficient to balance the account.

As many of the cards 8, 9, 10, 11 and 12 may be supplied as found desirable, and as many players may join in the game as wish to. It has been found preferable for ordinary conditions to provide a hundred cards made up miscellaneously of the cards 8, 9, 10, 11 and 12, or there may be twenty-five cards each of cards 8, 9, 10 and 11, and one auditor's card or card 12; or, any other number of cards may be utilized in making up a pack. When one hundred or one hundred one cards are used in a pack, not more than six players preferably play at one time. The players may play individually or as partners, and the end to be attained for the winning of the game is the securing of a balance of the account conducted by each individual player. When partners are playing, the balancing of the account of one of the partners causes the two partners to win the game.

It is understood, of course, that the dates and the amounts named on cards 8, 9 and 10 will vary amongst themselves, preferably with no duplicates, but the amounts are worked out so that when cards are received by a player in proper sequence, he should within a reasonable time effect a balance of his account without the aid of either the draft card or the auditor's card. It is a preferable rule of the game that the draft card cannot be used until at least three entries have been made under the June account, and the auditor's card cannot be used until after the fifth entry has been made in the June account.

The preferable mode of playing the game consists in supplying each player with a ledger sheet, such as sheet 1, and then, after shuffling the pack of cards, dealing to each player five cards. The balance of the pack is placed face downward upon the table, and the play beginning with the first player on the right of the dealer goes successively around the table until the cards of a player have been exhausted, when he takes another hand of five cards from the inverted pack. In the playing, each player first examines his hand and arranges the cards in the sequence of their dates. The first player then makes his first entry for April, as, for example, he may have a statement card 8 for $8.75, and in that case he enters the $8.75 in the first space of column 3, and also enters $8.75 in the first space of the balance column 6. The first player then places the card thus played in the discard, and the second player then plays his first card in the same way. If the second player (or any player) has for his first card nothing but credits, as, for example, cards like card 10, or like card 9, he enters the amount of the first of such cards in the first space for April in column 7 in red, and then discards the card thus played. When the play again reaches the first player, if he should be fortunate enough to have a credit card for April, such as card 9, or card 10, in the amount of $8.75, he enters the amount $8.75 in the credit column 5 and places ciphers in the balance column 6 and announces that his account has balanced and that he has won the game. The probability of such good fortune, however, is remote, and he must play whatever card he has for April. If he has no other card for April, he must discard any one of the cards which he holds in his hand, and the play goes around again. May cards must not be played until three entries have been made in April, and June cards must not be played until five entries have been made in May. The player must make his subtraction or addition with each entry and carry over his balance to the proper balance column 6 or 7, so that his ledger sheet will show the exact balance for each transaction. If, after the third entry in June, any player receives a draft card, that is card 11, he immediately balances his account thereby and wins the game; or if after he has five entries under June he receives a card 12, the auditor's card, he may claim the right of revision of the account, and claiming an error correct the account to make it balance and thereupon win the game. If either the draft card 11 or the auditor's card 12 is held by the player before the proper entries have been made in June, and no other card is held by him, he must play the card by discarding and not gaining the benefit of the entry which it would represent.

It will be understood from the foregoing that an almost endless amount of variety and change in the amounts named on the several cards 8, 9 and 10 may be indicated, and as many cards of all types may be provided in a deck or pack as preferred, but it is preferable to have a small number of cards 11 and 12, and a large number of the other cards. It is to be noted that the entry spaces for June are not limited, except by the necessary limitation in the size of the sheet 1, and as many entries may be made as required under June for effecting a balance, but while working under the June entries the player must discard successively, in lieu of a play, each card calling for April and May entries.

It will be observed that April, May and June have been arbitrarily selected, and that any other three months, or any other number of months, may be utilized instead with the understanding, of course, that the cards 8, 9, 10, 11 and 12 will bear indicia corresponding to the account dates of the ledger sheet.

For facility of identification, especially when the cards are held fan-like in the hand, abbreviated indicia, such as indicated at 13 on each of the several cards, is preferably supplied on the cards to indicate the month and character of the card.

What I claim is:

1. An educational game comprising the combination of a ledger sheet bearing columnar indicia for debits and credits, and a balance between the same and playing cards bearing indicia of debits and credits and for settlement of the balance shown adapted to have the data of the indicia on the cards entered on the ledger sheet.

2. An educational game comprising the combination of a ledger sheet bearing columnar indicia for debits and credits, and date indicia disposed relative to the debit and credit indicia, and playing cards bearing various indicia of debits and credits and dates to correspond with the date indicia of the ledger sheet.

3. An educational game comprising the combination of a ledger sheet bearing columnar indicia for debits and credits, and date indicia disposed relative to the debit and credit indicia, and playing cards bearing various indicia of debits and credits and dates to correspond with the date indicia of the ledger sheet, some of said cards bearing credit indicia of undetermined amounts to balance the account on the ledger sheet.

4. An educational game comprising the combination of a ledger sheet bearing columnar indicia for debits and credits, date indicia disposed relative to the debit and credit indicia, and playing cards bearing various indicia of debits and credits and dates to correspond with the date indicia of the ledger sheet, one of the cards bearing indicia of a sight draft for balancing the account on the ledger sheet.

5. An educational game comprising the combination of a ledger sheet bearing columnar indicia for debits and credits, date indicia disposed relative to the debit and credit indicia, and playing cards bearing various indicia of debits and credits and dates to correspond with the date indicia of the ledger sheet, one of the cards bearing indicia authorizing the player to audit and correct the account on the ledger sheet to an extent effecting a balance thereof.

In testimony whereof I affix my signature.

OLIVER P. McKEE.